United States Patent [19]
Takiyama et al.

[11] Patent Number: 5,837,755
[45] Date of Patent: Nov. 17, 1998

[54] BIODEGRADABLE THERMOSETTING UREA-RESIN COMPOSITIONS

[75] Inventors: Eiichiro Takiyama, Kamakura; Yoshitaka Hatano, Higashikanbara-gun, both of Japan

[73] Assignee: Showa Highpolymer Co., Ltd., Tokyo, Japan

[21] Appl. No.: 623,538

[22] Filed: Mar. 29, 1996

[30] Foreign Application Priority Data

| Mar. 29, 1995 | [JP] | Japan | 7-094146 |
| Apr. 8, 1995 | [JP] | Japan | 7-199860 |
| Apr. 8, 1995 | [JP] | Japan | 7-199861 |
| Aug. 23, 1995 | [JP] | Japan | 7-215021 |
| Aug. 28, 1995 | [JP] | Japan | 7-218992 |
| Aug. 28, 1995 | [JP] | Japan | 7-218993 |

[51] Int. Cl.$^6$ .......................... C08G 71/02; C08L 75/02; C08L 1/00
[52] U.S. Cl. ................. 524/18; 524/20; 524/22; 524/35; 524/219; 528/267; 528/270
[58] Field of Search ................. 524/18, 20, 22, 524/35, 219; 528/269, 270

[56] References Cited

U.S. PATENT DOCUMENTS 4,001,442 1/1977 Stahlberger et al. .................. 426/105

*Primary Examiner*—Nathan M. Nutter
*Attorney, Agent, or Firm*—Sughrue, Mion, Zinn, Macpeak & Seas, PLLC

[57] ABSTRACT

A urea-resin composition comprising a urea-formaldehyde reaction product, cellulose material, and at least one substance selected from the group cosisting of α-amino acid, powdered collagen and gelatin. The present invention provides urea-resin compositions which, having a property to harden under heating, are themselves biodegradable and have sufficient physical properties to be applied for practical purposes.

3 Claims, No Drawings

BIODEGRADABLE THERMOSETTING UREA-RESIN COMPOSITIONS

BACKGROUND OF THE INVENTION

1. Field of the Invention

This invention relates to biodegradable urea-resin compositions.

2. Prior Art

Plastics have been utilized in various industries but at the same time dumped wastes of those plastics consumed in great amounts have become a big social problem because they may pollute rivers, seas and land. To control such pollution, it has eagerly been desired to produce biodegradable plastics, and a number of possible candidates have been proposed such as synthetic resins with gluten and plasticizers added, synthetic resins combined with chitosan and pulp, plastics in which the acetate group of cellulose acetate has a low substituting activity of 2 or less, etc. Generally speaking, however, the use of such current biodegradable resins has not spread widely, and it would not be an undue underestimation to say that of them only aliphatic polyesters are practically usable.

Even aliphatic polyesters are limited in applicability owing to their disadvantages in hardness and heat-resistance because they also are a thermoplastic polymer.

Therefore, it is safe to say that at present there are no thermosetting resins which are practically usable as well as biodegradable.

This invention intends, by overcoming above problems, to provide biodegradable thermosetting urea-resin compositions which are also excellent in physical properties such as hardness and heat-resistance.

SUMMARY OF THE INVENTION

The present inventors have been studying ways to find a resin which is thermosetting and at the same time biodegradable, and unexpectedly discovered that reaction products synthesized from urea and formaldehyde meet the above requirements when combined with certain materials. This discovery lead to the present invention. Thus, the present invention is based on the dramatic discovery that urea-resin, which is normally not biodegradable, develops biodegradability when combined with certain materials. It should be added here that there are known techniques which consist of supplementing a thermosetting resin with large amounts of biodegradable fillers such as sugar, to confer biodegradability to parts of the resulting product. However, no technique has been known to endow a resin which is normally not biodegradable with biodegradability.

That is, the present invention provides a urea-resin composition comprising (a) a urea-formaldehyde reaction product resulting from reaction between urea and formaldehyde, (b) cellulose material, and (c) at least one substance selected from the group consisting of α-amino acid, powdered collagen and gelatin.

Further, the present invention provides the above urea-resin composition wherein 15 to 80 parts by weight of (b) cellulose material relative to 100 parts by weight of the (a) urea-formaldehyde reaction product and 0.1 to 30 parts by weight of (c) at least one substance selected from the group consisting of a α-amino acid, powdered collagen and gelatin relative to 100 parts by weight of the total of (a) and (b) components are used.

Furthermore, the present invention provides the above urea-resin composition wherein a urea-formaldehyde reaction product produced by reacting 1 to 1.3 mol of formaldehyde with 1 mol of urea is used.

Still further, the present invention provides a method for producing a urea-resin comprising the step of reacting 1 to less than 1.3 mols of formaldehyde with 1 mol urea.

Yet further the present invention provides the above method wherein 1 to 1.25 mol of formaldehyde is reacted with 1 mol urea.

Further the present invention provides a urea-resin composition consisting of a urea-formaldehyde reaction product produced by reacting 1 to less than 1.3 mol of formaldehyde with 1 mol of urea and cellulose material.

Furthermore, the present invention provides the above urea-resin composition wherein 15 to 80 parts by weight of cellulose material relative to 100 parts by weight of the urea-formaldehyde reaction product is used.

Biodegradability in this invention means that the product, when buried in soil, undergoes decomposition, loses its integrity, and disappears into the soil completely.

DETAILED DESCRIPTION OF THE INVENTION

This invention will be detailed below.

(Urea-Formaldehyde Reaction Product)

The urea-formaldehyde reaction product which may be used in this invention is what results from reaction between urea and formaldehyde, and can be any conventional product of the same kind.

It should be noted, however, that although for conventional urea-formaldehyde reaction products, it is usual to use 1.3 to 2 mol formaldehyde with respect to 1 mol urea, it is desirable for the present invention to use as little formaldehyde as possible to confer proper biodegradability to final products, and it is recommended, for example, to use 1 to 1.3 mol, preferably 1 to less than 1.3 mol, more preferably 1 to 1.25 mol formaldehyde with respect to 1 mol urea.

When more than 1.3 mol formaldehyde is used with respect to 1 mol urea, the resulting urea-resin will not show any biodegradability within one year. This was demonstrated by the test in which the urea-resin of the same composition did not show any biodegradability even when buried in soil for about one year. Use of less than 1 mol formaldehyde would be also undesirable because the resulting products would lack moldability.

Reaction between urea and formaldehyde may proceed according to convention, or, for example, it may proceed in marginally or moderately alkaline conditions at 40°–80° C.

The urea-formaldehyde reaction product thus obtained is a mixture of monomethylol urea, dimethylol urea and trimethylol urea, or the initial reaction products, though their proportions differ depending on the ratio of urea and formaldehyde, and.on the involved reaction condition. For example, if 1.3 mol formaldehyde is allowed to react with 1 mol urea, a mixture of monomethylol urea and dimethylol urea will be produced.

In this invention, certain materials are added to the above urea-formaldehyde reaction product, to develop biodegradability in the resulting resin itself.

For demonstration purposes, preferred combinations will be given as follows: the urea-formaldehyde reaction product, cellulose material and at least one substance selected from the group consisting of α-amino acid, powdered collagen and gelatin; and further depending on the reaction condition involved in production of the given urea-formaldehyde product, the urea-formaldehyde reaction product and cellulose material alone. All these combinations allow the resulting resin to develop biodegradability. These materials will be detailed below.

(Cellulose Material)

The cellulose material which may be used in this invention is represented by purified pulp which meets the present requirements fully. Linter can be mentioned as another material.

(α-Amino Acid)

The α-amino acid which may be used in the present invention is not restricted to any specific type, and may include any kind of the same category.

For example, glycine, alanine, leucine, isoleucine, valine, norvaline, serine, threonine, phenylalanine, tylosin, cysteine, methionine, aspartic acid, glutamic acid, oxyglutamic acid, arginine, lysine, histidine, proline, oxyproline, tryptophan may be cited. The α-amino acid should preferably be an L-isomer.

(Powdered Collagen)

Collagen belongs to hard proteins, and is a fibrous protein which is distributed widely in animal bodies such as connective tissues, bones, teeth, ligaments, tendons, corium, and fascia. For convenience, powdered collagen available in the market can be used; for example, Triazett (trade name) CX285-l, 260-1, 250-1, 240-1, 260-3, and 250-3 produced by Showa Denko K.K. may be cited. They satisfy quite well the requirements of the present invention. The fineness of the powder should be in the order of 6–13 $\mu$m (based on measurement with a laser-diffraction grain size meter (microtrack SRA)).

(Gelatin)

Gelatin is an aqueous soluble protein obtained from fish and animals, and any kind of gelatin can be used for the present invention, however, it is preferable to use purified and colorless ones.

(Combination Ratio)

The combination ratio of the individual components described above will be detailed below.

(1) A composition derived from the urea-formaldehyde reaction product, cellulose material, and at least one substance selected from the group comprising α-amino acid, powdered collagen, and gelatin (i) Fifteen to eighty, or preferably 20 to 70 parts by weight, more preferably 30 to 50 parts by weight of cellulose material may be added to 100 parts by weight of the urea-formaldehyde reaction product on the basis of calculated values (based on calculated values on the assumption that urea and formaldehyde have reacted 100%.). Cellulose material may be added as much as possible as long as it does not impair biodegradability of the final product, because cellulose material not only eases production of the composition but it also strengthens the mechanical properties thereof, thus contributing to improvements in moldability.

(ii) 0.1 to 30, or preferably 1 to 25, more preferably 3 to 20 parts by weight of α-amino acid, powdered collagen, and gelatin may be added to 100 parts by weight of the mixture composed of the urea-formaldehyde reaction product and cellulose material. Addition of less than 0.1 part by weight of them would not provide expected results in practice, while addition of more than 30 parts by weight would not lead to any notable improvement and might result in impairment of moldability of the final product.

(2) A composition derived from the urea-formaldehyde reaction product and cellulose material Even a composition derived only from the urea-formaldehyde reaction product and cellulose material may develop biodegradability depending on the reaction condition involved in its production.

Namely, when the urea-formaldehyde reaction product results from the reaction of formaldehyde of a concentration of not less than 1 mol but less than 1.3 mol or preferably of 1 to 1.25 mol with 1 mol urea, that reaction product, though being a composition supplemented only with cellulose material, develops biodegradability.

The present inventors found that the biodegradability of the resin depends on the molar ratio between urea and formaldehyde. Thus, if formaldehyde is added in excess of 1.3 mol, the resulting resin, when it is composed only of the urea-formaldehyde reaction product and cellulose material, will not develop biodegradability. For this resin to develop biodegradability, it is necessary to add thereto α-amino acid, powdered collagen or gelatin as previously described.

Further, according to the present invention, a starch in combination with the above components can be used. Although the starch which may be used in the present invention is not limited, potato starches and corn starches are exemplified. The combination ratio of such starches is about 5 to 30 parts by weight relative to 100 parts by weight of the urea-formaldehyde reaction product.

For the resin here concerned, 15 to 80, or preferably 20 to 70, or more preferably 30 to 50 parts by weight of cellulose material may be added to 100 parts by weight of the urea-formaldehyde reaction product.

(Preparation of the Compositions)

Compositions of the present invention can be prepared, for example, as follows: appropriate amounts of the above materials are added to the urea-formaldehyde reaction product, and the mixture is kneaded well and its pH is adjusted; the resulting mixture is then subjected to condensation at 40° to 70° C. and dried.

Then, the composition of the present invention may be pulverized with a bowl mill, and during pulverization a latent catalyst(s) or a mold lubricant(s) can be used in combination as appropriate.

Apart from the above procedures, ingredient materials may be added at any given steps in the process of this urea-resin production. For example, after a cellulose material has been added to the urea-formaldehyde reaction product, and the mixture dried, α-amino acid, powdered collagen and gelatin may be added thereto.

Further, in the process to produce the composition of the present invention, it is preferred to adjust the amount of water so as to give proper moldability. For example, the amount of water may be in the range of 1 to 5%. In addition, a small quantity of plasticizer including polyhydric alcohols such as glycerin may be used. The amount of the plasticizer to be used here should be varied according to the moldability to be achieved. For example, 1 to 50 weight parts of the plasticizer may preferably be added to 100 parts by weight of the urea-formaldehyde reaction product.

Obviously various other additives can be added to the composition of this invention as appropriate. For example, organic or inorganic fillers, reinforcing agents, lubricants, coloring agents, etc., can be mentioned.

Molding of the composition of the present invention can be made under the same condition applied to conventional commercial urea resins, or, for example, under a pressure of 20–150 kg/cm$^2$ at a temperature of 130°–150° C.

If an article, which is derived from urea-resin made of a conventional urea-formaldehyde reaction product and which has undergone hardening under high pressure and temperature, were buried in the soil for, say, 12 months, it would not show any sign of biodegradability. In other words, the urea-resin with cross-linking structure has no biodegradability.

However, when, for example, cellulose material is added to the urea-formaldehyde reaction product, or cellulose material and α-amino acid, etc. are added to the urea-formaldehyde reaction product, the resulting resin will have biodegradability, although it takes a considerable time for complete destruction to occur. This fact is quite unexpected based on conventional techniques.

Why addition of cellulose material, or cellulose material and α-amino acid etc. gives rise to biodegradability in the urea-resin with cross-linking structure still remains unclear, but the following can be given as a possible explanation: for example, α-amino acid that is readily digested by organisms affects the urea-resin with cross-linking structure in a manner still undefined, and thus the urea-resin with cross-linking structure may become susceptible to organic invasion.

Further, when α-amino acid, powdered collagen and gelatin are added, and particularly when the urea-resin reaction product depends on the use of less than 1.3 mol formaldehyde which is far below the corresponding value for conventional products, the resulting resin is remarkably improved in its mechanical properties and biodegradability for unknown reasons.

EXPERIMENTS

The present invention will be illustrated by way of the following Experiments but the present invention is not limited thereto.

The biodegradability test consists of the following procedures. The soil was prepared as follows: 90 parts by weight of river sand, 5 parts by weight of oil meal and 5 weight parts of compost were put into a planter; a sufficient amount of water was added and the mixture was stirred thoroughly; and the mixture was left for 15 days with occasional turn-ups. The articles in the following examples were buried at a depth of 10 cm under the soil, and water from a well was poured thereon weekly. The planter was covered with a polyethylene film folded double to prevent escape of moisture, and left at 30° C. for certain periods.

EXPERIMENT 1

One hundred-twenty grams of urea (U) and 210 g of 37% formalin (contains 37% formaldehyde (F)) (molar ratio of U to F=1/1.3) were placed in a three-mouthed separable flask with a capacity of 1 l, and the pH of the mixture was adjusted with 50% hexamethylenetetramine aqueous solution to 8.0. Then, a methylol reaction was allowed to proceed at 60° C. for 30 minutes.

As the reaction generated heat, the system was cooled to keep the mixture at about 60° C. After 25 minutes, white turbidity appeared.

Sixty-seven parts by weight of the resulting urea-formaldehyde reaction product (I), 15 parts by weight of purified pulp, and 18 parts by weight of corn starch were kneaded well with a small kneader. The resulting mass was placed in a metal bowl with a 80 mesh metal plate at its bottom, and heated at 40° C. for 12 hours, and then the temperature was raised at a rate of 10° C. per hour until 70° C. was reached when the mixture was allowed to dry and condense for 30 minutes.

To 100 parts by weight of the resulting mass were added 3 parts by weight of glutamic acid and 3 parts by weight of zinc stearate, and the mixture was ground in a small bowl mill for 12 hours.

The powder was strained with a 40 mesh to produce the composition (A) of the present invention.

Separately, 70 parts by weight of the reaction product (I), 30 parts by weight of purified pulp and 0.5 part by weight of ammonium chloride were processed in the same manner as above with the exception that starch and glutamic acid are not added here, to produce composition (B).

Both compositions were placed on a plate heated at 150° C. and pressed by a pressure of 100 kg/cm$^2$ for 3 minutes, to produce the following discs.

Composition (A) disc=86 mm in diameter and 0.5 to 0.6 mm in thickness.

Composition (B) disc=102 mm in diameter and 0.4 to 0.5 mm in thickness.

The two discs were subjected to the biodegradability test.

The disc made of composition (A) of the present invention was left in the soil for 2 months. The disc had shallow erosions on its surface as if gnawed by insects, and had turned brown, indicating signs of biodegradability. In contrast, composition (B), after having received the same treatment, showed the same appearance as composition (A) after about six months.

EXPERIMENT 2

The urea-formaldehyde reaction product (II) was obtained in the same manner as in Experiment 1, except the molar ratio of urea to formaldehyde was 1.2.

Seventy weight parts of the reaction product (II) and 30 parts by weight of purified pulp were kneaded well in a small kneader. The resulting mass was placed in a metal bowl with an 80 mesh metal plate at its bottom, and heated at 40° C. for 12 hours. Then, the temperature was raised at a rate of 10° C. per hour until 70° C. was reached. Here the mass was maintained at the same temperature for 30 minutes to promote drying and condensation.

To 100 weight parts of the resulting mass, were added 3 parts by weight of aspartic acid and 3 parts by weight of zinc stearate, and the mixture was ground in a small ball mill for 12 hours.

The powder was strained with a 40 mesh to produce the composition (C) of this invention.

Composition (C) was placed on a plate and pressed, while being heated at 150° C., by a pressure of 100 kg/cm$^2$ for 3 minutes, to produce a disc of 111 mm in diameter and 0.4 to 0.5 mm in thickness.

Disc (C) was then subjected to the biodegradability test.

After having been left in the soil for 3 months, it had indentations on some parts of the surface, turned yellow generally indicating digestion, and showed signs of biodegradability. Further, after 8 months, disc (C) was completely degraded and lost its integrity.

EXPERIMENT 3

To 120 g of urea (U) in a separable 1 l flask equipped with a stirrer, a reflux condenser and a thermometer was added 197 g of 37% formalin (containing 37% formaldehyde (F)) (the molar ratio of U to F=1/1. 2), and the mixture was adjusted to a pH of 8.0 by 50% hexamethylenetetramine aqueous solution. Then, the mixture underwent a methylol reaction at 60° C. for 30 minutes.

As the reaction generated heat, the system was cooled to keep the mixture at about 60° C.

To 100 parts by weight of the resulting urea-formaldehyde reaction product (III) was added 43 parts by weight of purified pulp, and the mixture was kneaded well in a small kneader to produce a mass of even texture. The mass was placed in a metal bowl with an 80 mesh metal plate at its bottom, and heated at 40° C. for 12 hours. Then, the temperature was raised at a rate of 10° C. per hour until 70° C. was reached at maximum. The temperature was maintained for 30 minutes to allow the mixture to dry and condense.

To 100 parts by weight of the resulting mass, were added 3 parts by weight of aspartic acid and 3 parts by weight of zinc stearate, and the mixture was ground for 12 hours in a small bowl mill.

The resulting powder was strained with a 40 mesh to produce the composition (D) of this invention.

The composition (D) was placed on a plate and pressed, while being heated at 150° C., by a pressure of 100 kg/cm$^2$ for 3 minutes, to produce a disc of 10 to 11 cm in diameter and 0.5 to 0.7 mm in thickness.

The disc was subjected to the biodegradability test.

The disc made of composition (D) of the present invention was left in the soil for 1 month, and showed the results as indicated in Table 1. This disc made of the composition of the present invention had a Rockwell hardness (M scale) of 115 to 117 and a thermal deformation temperature of about 130° C. This proved sufficient physic properties including hardness and heat-resistance for practical use.

EXPERIMENT 4

To produce this sample, the same procedure was repeated as in Experiment 3 with the exception that 180 g of formaldehyde (molar ratio of U to F 1/1.1) was used. The results of the biodegradability test applied to this sample are given in Table 1.

EXPERIMENT 5

To produce this sample, the same procedure was repeated as in Experiment 3 with the exception that 160 g of formaldehyde (molar ratio of U/F 1/1) was used. The results of the biodegradability test applied to this sample are given in Table 1.

EXPERIMENT 6

To produce this sample, the same procedure was repeated as in Experiment 3 with the exception that 210 g of formaldehyde (molar ratio of U/F 1/1.3), and 0.6 part by weight of ammonium chloride substituted for aspartic acid were used. The results of the 1-month biodegradability test applied to this sample are given in Table 1.

TABLE 1

| Product | Signs of biodegradability |
| --- | --- |
| Ex 3 (U/F ≈ 1/1.2 mol) | Erosions on ¼ to ⅕ of its surface due to digestion by organisms. |
| Ex 4 (U/F ≈ 1/1.1 mol) | Signs of disintegration on 60 to 70% of its mass. |
| Ex 5 (U/F ≈ 1/1 mol) | Disintegrated into pieces. Integrity lost. |
| Ex 6 (U/F ≈ 1/1.3 mol) | No apparent change present. |

As is obvious from inspection of Table 1, in production of the composition of the urea-formaldehyde reaction product and cellulose material, when less than 1.3 mol formaldehyde with respect to 1 mol urea and aspartic acid were used, the resulting product showed apparent biodegradability. However, when 1.3 mol formaldehyde and ammonium chloride substituted for aspartic acid were used, the resulting product did not show any signs of biodegradability. This suggests that a slight difference in the added amount of formaldehyde at the critical boundary can be a decisive factor for the product to gain biodegradability.

EXPERIMENTS 7–38

Preparation of a Molding Material (1)

Six hundred grams of urea (10 mol) and 810 g of 37% formalin (10 mol as corresponding formaldehyde) were mixed, and the mixture was adjusted to a pH of 8 by hexamethylenetramine, and allowed to react at 65° C. for 30 minutes.

Then, 390 g of purified pulp (about 30 weight % with respect to the urea-formaldehyde reaction product) was added, and the mixture kneaded at 35° to 40° C. for 30 minutes. Then, the mass was allowed to dry at 40° C. for 12 hours, at 50° C. for 1 hour, at 60° C. for 1 hour and at 70° C. for 2 hours. The resulting body was ground crudely in a ball mill. To this product were added 15 g of zinc stearate and a certain amount of a setting agent, and the mixture was ground again in the ball mill for 16 hours. After residues were removed with a 40 mesh strain, a molding material (1) was obtained.

Preparation of a Molding Material (2)

Reaction, drying and pulverization were allowed to proceed in the same manner as in preparation of the molding material (1) with the exception that 600 g of urea (10 mol) and 892 g of 37% formalin (11 mol with respect to formaldehyde) were used, to produce a molding material (2).

Preparation of a Molding Material (3)

Reaction, drying and pulverization were allowed to proceed in the same manner as in preparation of the molding material (1) with the exception that 600 g of urea (10 mol) and 975 g of 37% formalin (12 mol with respect to formaldehyde) were used, to produce a molding material (3).

Preparation of a Molding Material (4)

Reaction, drying and pulverization were allowed to proceed in the same manner as in preparation of the molding material (1) with the exception that 600 g of urea (10 mol) and 1055 g of 37% formalin (13 mol with respect to formaldehyde) were used, to produce a molding material (4).

(Experiments 7–10)

Three parts by weight of glutamic acid were added as a setting agent to 100 parts by weight of the composition comprising the urea-formaldehyde reaction product each from the molding materials (1) to (4), and cellulose material.

(Experiments 23–26)

0.5 part by weight of ammonium chloride was added as a setting agent to 100 weight parts of the composition comprising the urea-formaldehyde reaction product each from the molding materials (1) to (4), and cellulose material.

From each molding material a mold was produced under a pressure of 50 kg/cm$^2$ at 150° C. for 5 minutes in accordance with the thermosetting resin test as specified in JIS K6911. The article obtained was checked for its physical properties. The results are given in Table 2.

TABLE 2

| Test sample | Ratio of Urea/ formaldehyde | bending strength (kg/mm$^2$) | modulus of elasticity for bending (kg/mm$^2$) | Charpy impact value kg · cm |
| --- | --- | --- | --- | --- |
| Ex 23 | 1/1 | 4.7 | 819 | 2.3 |
| Ex 7 |  | 6.0 | 806 | 3.6 |
| Ex 24 | 1/1.1 | 5.8 | 905 | 3.1 |
| Ex 8 |  | 6.9 | 870 | 3.8 |

TABLE 2-continued

| Test sample | Ratio of Urea/ formaldehyde | bending strength (kg/mm²) | modulus of elasticity for bending (kg/mm²) | Charpy impact value kg · cm |
|---|---|---|---|---|
| Ex 25 | 1/1.2 | 7.0 | 998 | 3.0 |
| Ex 9 |  | 8.1 | 906 | 4.3 |
| Ex 26 | 1/1.3 | 7.7 | 979 | 4.0 |
| Ex 10 |  | 8.7 | 960 | 5.0 |

As is obvious from inspection of Table 2, the systems where glutamic acid was used as a setting agent are better in physical properties than those were ammonium chloride has been used.

(Experiments 11–14 and 27–30)

The compositions produced as specified in Experiments 7–10 and 23–26 were pressed by a pressure of 50 kg/cm² while being heated at 150° C., to produce discs whose dimensions were as described in Table 3.

TABLE 3

|  |  | Dimensions of discs | |
|---|---|---|---|
|  | Derived from | Diameter (mm) | Thickness (mm) |
| Ex 11 | Ex 7 | ca 113 | ca 0.34 |
| Ex 27 | Ex 23 | ca 104 | ca 0.43 |
| Ex 12 | Ex 8 | ca 108 | ca 0.41 |
| Ex 28 | Ex 24 | ca 103 | ca 0.42 |
| Ex 13 | Ex 9 | ca 103 | ca 0.42 |
| Ex 29 | Ex 25 | ca 99 | ca 0.44 |
| Ex 14 | Ex 10 | ca 100 | ca 0.41 |
| Ex 30 | Ex 26 | ca 87 | ca 0.46 |

The discs thus obtained were subjected to the biodegradability test. The results after they had been left in the soil for 3 months are shown in Table 4.

TABLE 4

| Ex 11 | Almost disappeared and no discernible shape. |
| Ex 27 | Disintegrated into pieces and integrity lost. Disintegration present on the whole surface. |
| Ex 12 | Cracks all over the surface. Turned brown. Pinholes developed. At threshold of disintegration. |
| Ex 28 | Pinholes developed on 60 to 70% of the whole surface. Signs of disintegration. |
| Ex 13 | Brown discoloration spread all over the surface. Pinholes developed on the whole surface. Big cracks developed. |
| Ex 29 | Surface erosions (due to digestion by organisms) present on ¼ to ⅕ of the whole surface. |
| Ex 14 | Disintegrated into pieces and integrity lost. |
| Ex 30 | Turned brown, and innumerable spots present. Integrity preserved. |

(Experiments 15–18)

Three parts by weight of aspartic acid were added as a setting agent to 100 weight parts of the composition comprising the urea-formaldehyde reaction product each from the molding materials (1) to (4), and cellulose material.

(Experiments 31–34)

A half unit weight part of ammonium chloride was added as a setting agent to 100 weight parts of the composition comprising the urea-formaldehyde reaction product each from the molding materials (1) to (4), and cellulose material.

From each molding material a mold was produced under a pressure of 50 kg/cm² at 150° C. for 5 minutes in accordance with the thermosetting resin test as specified in JIS K6911. The mold was checked for its physical properties. The results are given in Table 5.

TABLE 5

| Test sample | Ratio of Urea/ formaldehyde | bending strength (kg/mm²) | modulus of elasticity for bending (kg/mm²) | Charpy impact value kg · cm |
|---|---|---|---|---|
| Ex 31 | 1/1 | 4.7 | 819 | 2.3 |
| Ex 31 | 1/1 | 4.7 | 819 | 2.3 |
| Ex 15 |  | 6.8 | 823 | 3.2 |
| Ex 32 | 1/1.1 | 5.8 | 905 | 3.1 |
| Ex 16 |  | 6.7 | 876 | 3.6 |
| Ex 33 | 1/1.2 | 7.0 | 998 | 3.0 |
| Ex 17 |  | 8.7 | 921 | 4.5 |
| Ex 34 | 1/1.3 | 7.7 | 979 | 4.0 |
| Ex 18 |  | 9.1 | 956 | 5.1 |

As is obvious from inspection of Table 5, the systems in which aspartic acid was used as a setting agent have better physical properties than those in which ammonium chloride was used.

(Experiments 19–22 and 35–38)

The compositions produced as described in Experiments 15–18 and 31–34 were pressed by a pressure of 50 kg/cm² for 5 minutes while being heated at 150° C., to produce the discs as indicated in Table 6.

TABLE 6

|  |  | Dimensions of discs | |
|---|---|---|---|
|  | Compositions Used | Diameter (mm) | Thickness (mm) |
| Ex 19 | Ex 15 | ca 109 | ca 0.39 |
| Ex 35 | Ex 31 | ca 104 | ca 0.43 |
| Ex 20 | Ex 16 | ca 109 | ca 0.40 |
| Ex 36 | Ex 32 | ca 103 | ca 0.42 |
| Ex 21 | Ex 17 | ca 101 | ca 0.42 |
| Ex 37 | Ex 33 | ca 99 | ca 0.44 |
| Ex 22 | Ex 18 | ca 100 | ca 0.37 |
| Ex 38 | Ex 34 | ca 87 | ca 0.46 |

The discs thus obtained were subjected to the biodegradability test. The results, after the discs were left in the soil for 2 months, are given in Table 7.

TABLE 7

| Ex 19 | Small bits of remains left. Almost completely disintegrated. |
| Ex 35 | Disintegrated into pieces, and no integrity left. General disintegration apparent |
| Ex 20 | Disintegrated into 3 to 4 pieces. Turned dark brown. Multiple pinholes developed. |
| Ex 36 | Pinholes developed on 60 to 70% of the whole surface. Signs of disintegration apparent. |
| Ex 21 | Pinholes developed on the whole surface, and stained dark brown. Signs of disintegration apparent. |
| Ex 37 | Surface erosions (due to digestion by organisms) apparent on ¼ to ⅕ of the whole surface. |
| Ex 22 | Whole surface turned dark brown, and innumerable pores appeared. Being at threshold of destruction by organic digestion. |
| Ex 38 | Whole surface turned brownish, and brown spots scattered. No signs of organic digestion yet. |

EXPERIMENTS 39–44

(Experiment 39)

2400 g of urea and 3850 g of 37% formalin (molar ratio of urea to formaldehyde=1/1. 2) were placed in a separable flask of 5l capacity which was equipped with a stirrer, a reflux condenser, and a thermometer, and, after the pH was adjusted to 8 by hexamethylenetetramine, the mixture was allowed to react at 65° C. for 30 minutes to produce urea-formaldehyde reaction product. Then, to this product was added 1700 g (about 33 weight %) of purified pulp, and the mixture was kneaded with a kneader to even texture. The resulting mass was left at 40° C. overnight, and dried at 80° C. for 30 minutes to promote condensation.

Then, to 500 g of the condensate were added 20 g of glycine, 5 g of zinc stearate, and 15 g of aspartic acid, and the mixture was ground in a bowl mill overnight, to produce a composition.

The composition was submitted to a condition comprising 150° C., 50 kg/cm$^2$ and 5 minutes in accordance with the thermosetting resin test as specified in JIS K6911, to produce a test piece. The test piece was subjected to the mechanical test the results of which are given in Table 8.

(Experiment 40)

The same procedure as employed for producing Experiment 39 was repeated with the exception that 20 g of D,L-methionine substituted for glycine was used, to produce a test piece to be submitted to the mechanical test. The results are given in Table 8.

(Experiment 41)

The same procedure as employed for producing Experiment 39 was repeated with the exception that 20 g of lysine substituted for glycine was used, to produce a test piece to be submitted to the mechanical test. The results are given in Table 8.

(Experiment 42)

The same procedure as employed for producing Experiment 39 was repeated with the exception that 20 g of phenylalanine substituted for glycine was used, to produce a test piece to be submitted to the mechanical test. The results are given in Table 8.

(Experiment 43)

The same procedure as employed for producing Experiment 39 was repeated with the exception that 20 g of tryptophan substituted for glycine was used, to produce a test piece to be submitted to the mechanical test. The results are given in Table 8.

(Experiment 44)

The same procedure as employed for producing Experiment 39 was repeated with the exception that 3 g of ammonium chloride substituted for α-amino acid (glycine and aspartic acid) was used, to produce a test piece to be submitted to the mechanical test. The results are given in Table 8.

TABLE 8

|  | Bending Strength (kg/mm$^2$) | Modulus of elasticity for bending (kg/mm$^2$) | Charpy impact value (kg · cm) |
| --- | --- | --- | --- |
| Ex 44 | 7.0 | 874 | 3.6 |
| Ex 39 | 6.6 | 810 | 4.1 |
| Ex 40 | 5.9 | 754 | 3.9 |
| Ex 41 | 6.8 | 745 | 3.9 |
| Ex 42 | 7.1 | 801 | 4.1 |
| Ex 43 | 7.0 | 890 | 4.2 |

As is obvious from inspection of Table 8, addition of α-amino acid did not bring about big changes in physical properties, and the compositions of the present invention supplemented with α-amino acid were all practically usable.

The compositions obtained through the procedures as specified in Experiments 39–44 were pressed by a pressure of 50 kg/cm$^2$ for 5 minutes while being heated at 150° C., to produce discs of 7 to 8.5 mm in diameter and about 0.5 mm in thickness. The discs were submitted to the biodegradability test.

The results, after the discs were left in the soil for 2 months, are given in Table 9.

TABLE 9

| Ex 39 | Whole surface turned brown. Innumerable pinholes developed. Three big cracks. Being at threshold of total destruction. |
| --- | --- |
| Ex 40 | Same symptoms as in Ex 39. Disintegrated to 5 to 6 pieces. Better disintegrated than Ex 39. |
| Ex 41 | Turned brown generally. Disintegrated to pieces. No integrity left. |
| Ex 42 | Nearly same as in Ex 39. |
| Ex 43 | Nearly same as in Ex 39. |
| Ex 44 | Turned brownish. Only a few pinholes developed. Integrity preserved. |

It is evident from inspection of Table 9 that the discs made from the composition comprising α-amino acid are digested faster than that from the Comparison.

EXPERIMENT 45

240 g of urea and 385 g of 37% formalin (molar ratio of urea to formaldehyde=1/1.2) were placed in a separable flask of 1 l capacity which was equipped with a stirrer, a reflux condenser, and a thermometer, and, after the pH was adjusted to 8 by hexamethylenetetramine, the mixture was allowed to react at 65° C. for 30 minutes to produce urea-formaldehyde reaction product. Then, to this product was added 170 g (about 33 weight % with respect to urea-formaldehyde reaction product) of purified pulp, and the resulting mass was left at 40° C. overnight, and dried at 80° C. for 30 minutes to promote condensation.

To 100 parts by weight of the resin thus obtained were added 5 parts by weight of powdered collagen (Triazett CX285-1 comprising particles having an average diameter of 6 μm, Showa Denko K.K.), 1 part by weight of stearic acid, and 3 parts by weight of L-aspartic acid as a setting agent, and the mixture was ground in a ball mill overnight to homogeneity, to produce a composition of this invention.

The composition was submitted to a condition comprising 150° C., 50 kg/cm$^2$ and 5 minutes in accordance with the thermosetting resin test as specified in JIS K6911, to produce a molded product. The molded product was subjected to the mechanical test the results of which are given in Table 10.

EXPERIMENT 46

The same procedure as employed for producing Experiment 45 was repeated except that 10 weight parts of powdered collagen was used, to produce a molded product to be submitted to the mechanical test. The results are given in Table 10.

EXPERIMENT 47

The same procedure as employed for producing Experiment 45 was repeated with the exception that 0.5 part by weight of ammonium chloride substituted for powdered collagen and L-aspartic acid was used, to produce a molded product to be submitted to the mechanical test. The results are given in Table 10.

TABLE 10

|  | Ex 45 | Ex 46 | Ex 47 |
|---|---|---|---|
| Bending strength (kg/mm$^2$) | 7.8 | 7.6 | 7.3 |
| Modulus of elasticity for bending (kg/mm$^2$) | 900 | 891 | 910 |
| Charpy impact value (kg · cm) | 4.5 | 4.9 | 3.8 |

As is obvious from inspection of Table 10, the systems in which powdered collagen was used have better physical properties than the systems without collagen.

The molded products produced through the procedures as specified in Experiments 45–47 were subjected to the biodegradability test.

The molded products, after having been left in the soil for 1 to 2 months, were submitted to the test, the results of which are given in Table 11.

TABLE 11

|  | Ex 45 | Ex 46 | Ex 47 |
|---|---|---|---|
| 1 month in soil | Multiple pores on surface. Turned brownish. | Multiple pores on surface. Turned brown. | Dimple patterns on 1/4 of whole surface. Had a shade of brown. |
| 2 months pores in soil | Broken to 6 pieces varying in size. | Broken to pieces. No integrity. | Innumerable on surface. Turned brownish |

It is evident from inspection of Table 11 that articles made from the composition comprising collagen are digested faster than those from the Comparison.

EXPERIMENT 48

240 g of urea and 385 g of 37% formalin (molar ratio of urea to formaldehyde=1/1.2) were placed in a separable flask of 1 l capacity which was equipped with a stirrer, a reflux condenser, and a thermometer, and, after the pH was adjusted to 8 by hexamethylenetetramine, the mixture was allowed to react at 65° C. for 30 minutes to produce urea-formaldehyde reaction product. Then, to this product was added 170 g (about 33 weight % with respect to urea-formaldehyde reaction product) of purified pulp, and the resulting mass was kneaded in a kneader. Then, to the product was added further a solution which resulted from dissolution of 30 g of gelatin in 170 g of warm water.

The mixture was left at 40° C. overnight, and at 80° C. for 30 minutes to promote drying for condensation.

To the product were added 6 g of stearic acid and 15 g of aspartic acid, and the mixture was ground in a bowl mill overnight to homogeneity, to produce a composition.

The composition thus obtained was submitted to a condition comprising 150° C., 50 kg/cm$^2$ and 5 minutes in accordance with the thermosetting resin test as specified in JIS K6911, to produce a molded product. The molded product was subjected to the mechanical test the results of which are given in Table 12.

EXPERIMENT 49

The same procedure as employed for producing Experiment 48 was repeated with the exception that 3 g of ammonium chloride substituted for gelatin and aspartic acid was used, to produce a molded product to be submitted to the mechanical test. The results are given in Table 12.

TABLE 12

|  | Ex 48 | Ex 49 |
|---|---|---|
| Bending strength (kg/mm$^2$) | 7.0 | 7.0 |
| Modulus of elasticity for bending (kg/mm$^2$) | 933 | 998 |
| Charpy impact value (kg · cm) | 4.1 | 3.0 |

As is obvious from inspection of Table 12, the system in which gelatin has been used has better physical properties than the system without gelatin.

The compositions obtained through the procedures as specified in Experiments 48 and 49 were pressed by a pressure of 50 kg/cm$^2$ for 5 minutes while being heated at 150° C., to produce discs of 8.1 to 8.5 mm in diameter and about 0.5 mm in thickness. The discs were submitted to the biodegradability test.

After having been left in the soil for 3 months, the disc made from the composition with gelatin turned brown on its whole surface, showed innumerable pinholes and some cracks, and was apparently at the threshold of disintegration. In contrast, the disc made from the composition without gelatin turned brownish, developed pinholes on ⅓ of the whole surface, and preserved the integrity. Thus, there is an apparent difference in biodegradability between the two compositions.

The present invention provides urea-resin compositions which, having a property to harden under heating, are themselves biodegradable and have sufficient physical properties to be applied for practical purposes.

What is claimed is:

1. A urea-resin composition comprising (a) a urea-formaldehyde reaction product resulting from reaction between urea and formaldehyde, (b) cellulose material, and (c) at least one substance selected from the group consisting of α-amino acid, powdered collagen and gelatin, wherein 15 to 80 parts by weight of (b) cellulose material relative to 100 parts by weight of (a) urea-formaldehyde reaction product and 0.1 to 30 parts by weight of (c) at least one substance selected from the group consisting of α-amino acid, powdered collagen and gelatin relative to 100 parts by weight of the total of the (a) and (b) components are used.

2. The urea-resin composition of claim 1 wherein a urea-formaldehyde reaction product produced by reacting 1 to 1.3 mol of formaldehyde with 1 mol of urea is used.

3. A urea-resin composition consisting of a urea-formaldehyde reaction product produced by reacting 1 to less than 1.3 mol of formaldehyde with 1 mol of urea and cellulose material, wherein 15 to 80 parts by weight of the cellulose material relative to 100 parts by weight of the urea-formaldehyde reaction product is used.

* * * * *